US010701554B2

United States Patent
Lee

(10) Patent No.: US 10,701,554 B2
(45) Date of Patent: Jun. 30, 2020

(54) WIRELESS COMMUNICATION DEVICE ADAPTIVELY CHANGING CAPABILITY AND METHOD OF OPERATION THEREOF

(71) Applicant: Samsung Electronics Co., Ltd., Suwon-si, Gyeonggi-do (KR)

(72) Inventor: Kang-yong Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/430,917

(22) Filed: Jun. 4, 2019

(65) Prior Publication Data

US 2020/0107187 A1    Apr. 2, 2020

(30) Foreign Application Priority Data

Sep. 27, 2018    (KR) .................... 10-2018-0115342

(51) Int. Cl.
| | |
|---|---|
| *H04W 72/00* | (2009.01) |
| *H04W 56/00* | (2009.01) |
| *H04W 8/24* | (2009.01) |
| *H04W 88/02* | (2009.01) |
| *H04W 92/10* | (2009.01) |

(52) U.S. Cl.
CPC .............. *H04W 8/24* (2013.01); *H04W 88/02* (2013.01); *H04W 92/10* (2013.01)

(58) Field of Classification Search
CPC .. H04W 8/24; H04W 56/0045; H04W 72/085
USPC ................................................. 370/311, 329
See application file for complete search history.

(56) References Cited

U.S. PATENT DOCUMENTS

| | | | |
|---|---|---|---|
| 8,588,151 B2 | 11/2013 | Tenny | |
| 8,699,997 B2 | 4/2014 | Mildh et al. | |
| 8,750,227 B2 * | 6/2014 | Lindoff | H04L 5/0098 |
| | | | 370/329 |
| 8,891,458 B2 | 11/2014 | Tenny | |
| 9,178,562 B2 | 11/2015 | Dua et al. | |
| 9,287,958 B2 * | 3/2016 | Son | H04B 7/0628 |
| 9,295,003 B2 | 3/2016 | Oteri et al. | |
| 10,064,183 B2 * | 8/2018 | Moon | H04L 5/005 |

(Continued)

FOREIGN PATENT DOCUMENTS

KR    10-2016-0001272 A    1/2016

*Primary Examiner* — William D Cumming
(74) *Attorney, Agent, or Firm* — Harness, Dickey & Pierce, P.L.C.

(57) ABSTRACT

A method, performed by a device configured to perform communication with a base station, and including detecting whether an abnormality of the device occurs in response to an event signal, sending a request to the base station for permission to change a capability of the device based on the detecting that the abnormality occurs, changing the capability of the device based on a permission indication received from the base station in response to the sending the request, sending changed capability information to the base station based on the changing, and performing a radio resource connection (RRC) reconfiguration operation based on an RRC reconfiguration message received from the base station in response to the sending the changed capability information. A device performing the method adaptively changes a capability of the device to mitigate an error or impairment caused by an abnormality.

20 Claims, 12 Drawing Sheets

(56) References Cited

U.S. PATENT DOCUMENTS

| | | | |
|---|---|---|---|
| 10,070,406 B2* | 9/2018 | Takekawa | H04W 56/0045 |
| 10,523,299 B2* | 12/2019 | Nilsson | H04B 17/382 |
| 2012/0127905 A1* | 5/2012 | Lindoff | H04L 5/0098 |
| | | | 370/311 |
| 2016/0157228 A1 | 6/2016 | Yum et al. | |
| 2017/0013582 A1* | 1/2017 | Takekawa | H04W 56/0045 |
| 2017/0094545 A1 | 3/2017 | Subrahmanya et al. | |
| 2019/0124527 A1* | 4/2019 | Nilsson | H04B 7/0617 |
| 2019/0149215 A1* | 5/2019 | Nilsson | H04B 7/0639 |
| | | | 375/262 |
| 2020/0045684 A1* | 2/2020 | Futaki | H04W 72/085 |

* cited by examiner

FIG. 6

| RESOURCES | ABNORMALITY CONDITION | ABNORMALITY RELEASE CONDITION |
|---|---|---|
| AVAILABLE MEMORY SIZE | AVAILABLE MEMORY SIZE $\leq$ Mth − Hys_m | AVAILABLE MEMORY SIZE > Mth + Hys_m |
| TEMPERATURE | CURRENT TEMPERATURE $\geq$ Tth + Hys_t | CURRENT TEMPERATURE < Tth − Hys_t |
| REMAINING AMOUNT OF POWER | REMAINING AMOUNT OF POWER $\leq$ Bth − Hys_p | REMAINING AMOUNT OF POWER > Bth + Hys_p |
| IDLE STATE RATIO | IDLE STATE RATIO $\leq$ Ith − Hys_c | IDLE STATE RATIO > Ith + Hys_c |

```
csirs                  SEQUENCE {
    csirs-ResourceList    SEQUENCE (SIZE (1..maxRA-CSIRS-Resources)) OF CFRA-CSIRS-Resource,
                                    └──────────────── 210 ────────────────┘
```

FIG. 9B

```
Phy-ParametersCommon    ::=    SEQUENCE {
    csi-RS-CFRA-ForHO           ENUMERATED {supported}        OPTIONAL,
                                └─────── 220 ───────┘
```

FIG. 10

| | WHETHER TO CHANGE | BEFORE CHANGING | AFTER CHANGING |
|---|---|---|---|
| i_1 | X | | |
| i_2 | X | SUPPORT | SUPPORT |
| i_3 | O | □ → □ | |
| i_4 | O | NOT SUPPORT → SUPPORT | |

TB3

WIRELESS COMMUNICATION DEVICE ADAPTIVELY CHANGING CAPABILITY AND METHOD OF OPERATION THEREOF

CROSS-REFERENCE TO RELATED APPLICATION

This application claims the benefit of Korean Patent Application No. 10-2018-0115342, filed on Sep. 27, 2018, in the Korean Intellectual Property Office, the disclosure of which is incorporated herein in its entirety by reference.

BACKGROUND

The inventive concepts relate to a wireless communication device and a method of operating the same, and more particularly, to a wireless communication device that adaptively changes a capability and an operation method of the wireless communication device.

A wireless communication network may be widely applied to provide various types of communication content such as voice data, video data, packet data, and message data. Recently, with the increased development of mobile services provided over wireless communication networks, the amount of data to be processed has rapidly increased, and thus, a modem that supports high-speed signal processing would be desirable.

In addition, as the development of internet of things (IoT) and automobile communication modules increases, a modem having low cost and limited resources which supports the wireless communication network, and a device including the same, would be desirable. For example, when low cost devices having limited resources experience an increase in an amount of communication data in the wireless communication network, capability degradation may occur as the limited resources become exhausted.

SUMMARY

The inventive concepts relate to a wireless communication device and a method of operating the same and provide a wireless communication device configured to adaptively change a capability based on available resources and an operation method of the wireless communication device.

According to an aspect of the inventive concepts, there is provided a method performed by a device configured to perform communication with a base station. The method includes detecting whether an abnormality of the device occurs in response to an event signal, sending a request to the base station for permission to change a capability of the device based on the detecting that the abnormality occurs, changing the capability of the device based on a permission indication received from the base station in response to the sending the request, sending changed capability information to the base station based on the changing, and performing a radio resource connection (RRC) reconfiguration operation based on an RRC reconfiguration message received from the base station in response to the sending the changed capability information.

According to an aspect of the inventive concepts, there is provided a device configured to perform wireless communication with a base station. The device includes a memory storing computer-readable instructions, and at least one processor configured to execute the computer-readable instructions to determine available resources of each of a plurality of functional blocks, each of the plurality of functional blocks being configured to perform signal processing associated with the wireless communication, determine whether each functional block among the plurality of functional blocks is in an abnormality state based on the available resources, and change a capability item associated with the available resources of each of the plurality of functional blocks in response to receiving a capability change permission indication from the base station based on the determination that a functional block among the plurality of functional blocks is in the abnormality state.

According to an aspect of the inventive concepts, there is provided a method performed by a base station configured to perform wireless communication with a terminal. The method includes determining whether to permit a capability change of the terminal based on a capability change permission request and a reason for the capability change permission request, sending a capability change permission indication and a capability inquiry signal to the terminal in response to the determining to permit the capability change, receiving, from the terminal, changed capability information in response to the sending the capability inquiry signal, changing a configuration of the wireless communication based on the changed capability information, and sending a radio resource connection (RRC) reconfiguration message to the terminal based on the changing the configuration.

BRIEF DESCRIPTION OF THE DRAWINGS

Example embodiments of the inventive concepts will be more clearly understood from the following detailed description taken in conjunction with the accompanying drawings in which:

FIG. 6 illustrates an example of a reference table that is referred to when an abnormality is detected according to an example embodiment of the inventive concepts;

FIGS. 9A and 9B are diagrams explaining each example of a capability item according to an example embodiment of the inventive concepts;

FIG. 10 illustrates a table that defines capability items associated with a resource according to an example embodiment of the inventive concepts;

DETAILED DESCRIPTION

Hereinafter, example embodiments of the inventive concepts will be described in detail with reference to the accompanying drawings.

Figure 1:
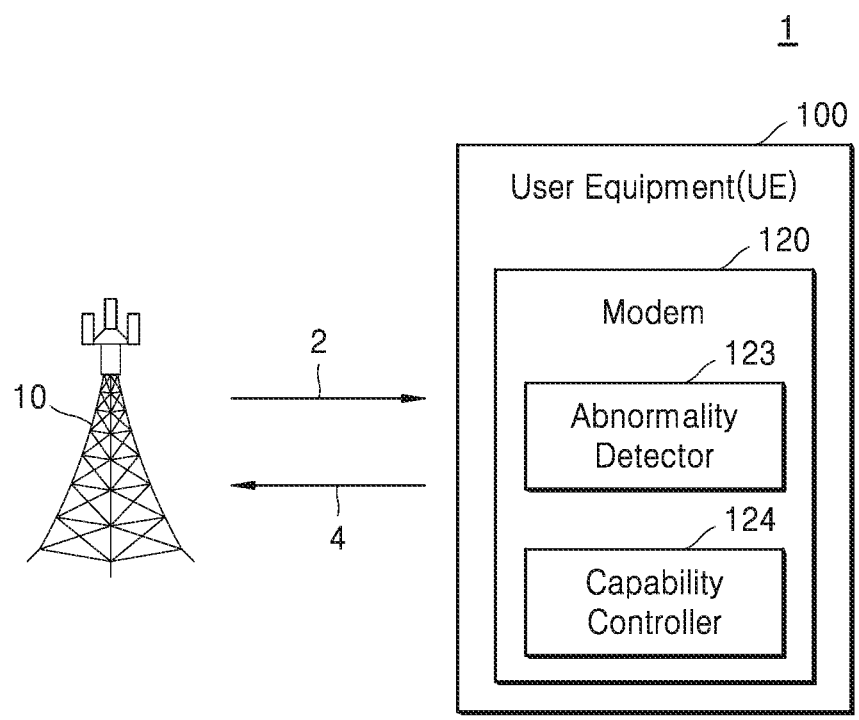
FIG. 1 shows a block diagram of a wireless communication system according to an example embodiment of the inventive concepts.

FIG. 1 shows a block diagram of a wireless communication system according to an example embodiment of the inventive concepts. Referring to FIG. 1, a wireless communication system 1 may include a base station (or cell) 10 and user equipment (UE) 100.

The base station 10 may communicate wirelessly with the user terminal 100 through one or more base station antennas. For example, the base station 10 and the user terminal 100 may communicate through a downlink (DL) channel 2 and/or an uplink (UL) channel 4. A wireless communication network between the base station 10 and the user terminal 100 may support communication of multiple users by sharing available network resources. For example, in a wireless communication network, information may be transferred in a variety of ways such as code division multiple access (CDMA), frequency division multiple access (FDMA), time division multiple access (TDMA), orthogonal frequency division multiple access (OFDMA), and/or single carrier frequency division multiple access (SC-FDMA).

Although only one base station 10 is illustrated in the drawings, this is for convenience of description only and the wireless communication system 1 may include more or fewer base stations 10. In addition, the wireless communication system 1 may also include different types of base stations (e.g., macro, micro and/or pico base stations).

The base station 10 may provide communication coverage for a geographic area. In some examples, the base station 10 may be referred to as a base transceiver station (BTS), a radio base station, an access point (AP), a radio transceiver, a NodeB, an eNodeB (eNB), a Home NodeB, a Home eNodeB, and/or some other appropriate term.

In an example embodiment, the base station 10 may receive a capability change request of the user terminal 100 from the user terminal 100. The capability of the user terminal 100 may vary according to, for example, data throughput, technological functionalities, compatible protocols and/or applications based on the communication between the base station 10 and the user terminal 100. In addition, the base station 10 may further receive a reason for the capability change from the user terminal 100 and may determine whether the capability change of the user terminal 100 is permitted based on the reason for the capability change.

The base station 10 may determine a capability change permission of the user terminal 100 and thus may transmit a permission determination and a capability inquiry signal to the user terminal 100. The base station 10 may receive capability information changed from the user terminal 100 to change a configuration related to the communication based on the received capability information.

The user terminal 100 may be a wireless communication device which refers to one of various types of devices that are fixed or mobile and communicate with the base station 10 to transmit and/or receive data and/or control information. For example, the user terminal 100 may refer to terminal equipment, user equipment (UE), a mobile station (MS), a mobile terminal (MT), a user terminal (UT), a subscriber station (SS), a wireless device, a handheld device, and/or the like.

The user terminal 100 may include a modem 120. The modem 120 may be configured to perform various functions related to a wireless interface between the base station 10 and the user terminal 100. For example, the modem 120 may be used for modulation of signals to be transmitted to the base station 10 and/or demodulation of signals received from the base station 10 and may be configured to perform communication functions such as various encoding and/or decoding.

In an example embodiment, the modem 120 may include an abnormality detector 123 and a capability controller 124. Each of the abnormality detector 123 and the capability controller 124 may be a hardware block that includes analog circuitry and/or digital circuitry. Alternatively or additionally, the modem 120 may further include at least one processor, and each of the abnormality detector 123 and the capability controller 124 may be a software block that includes a plurality of computer-readable instructions executed by the at least one processor. The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multi-processor, an application-specific integrated circuit (ASIC), and a field programmable gate array (FPGA).

The abnormality detector 123 may verify available resources of the user terminal 100 to detect an abnormal state based on the verified available resources. For example, the abnormality detector 123 may detect an abnormality based on information for at least one of an available memory of the user terminal 100, a temperature of the user terminal 100, a remaining battery power of the user terminal 100, and/or a processor capability included in the user terminal 100.

In an example embodiment, the abnormality detector 123 may detect the abnormality condition in response to an event signal that occurs at a certain period. The abnormality detector 123 may refer to functional blocks included in the user terminal 100 for a certain interval to verify the available resources. Based on this, the abnormality detector 123 may detect whether an abnormality of the user terminal 100 occurs. The user terminal 100 may include a plurality of functional blocks, each of the plurality of function blocks may be a hardware block that includes analog circuitry and/or digital circuitry. Additionally or alternatively, each of the plurality of function blocks may be a software block that includes a plurality of computer-readable instructions executed by the at least one processor.

In an example embodiment, the abnormality detector 123 may receive an event signal output from a functional block in response to a particular situation occurrence to detect an abnormality based on the received event signal. For example, the abnormality detector 123 may refer to functional blocks included in the user terminal 100 to verify the available resources in response to an event signal output from a memory provided in the user terminal 100.

The capability controller 124 may control a capability of the user terminal 100 in response to a capability change permission decision of the base station 10. In an example embodiment, the capability controller 124 may control capability items associated with each of the resources of the user terminal 100 when the base station 10 has determined a capability change permission. As an example, the capability controller 124 may change an entry size of the corresponding capability item when the capability item is in a list format. As another example, the capability controller 124 may change whether the corresponding capability item is supported when the capability item is not in the list format.

Figure 2:
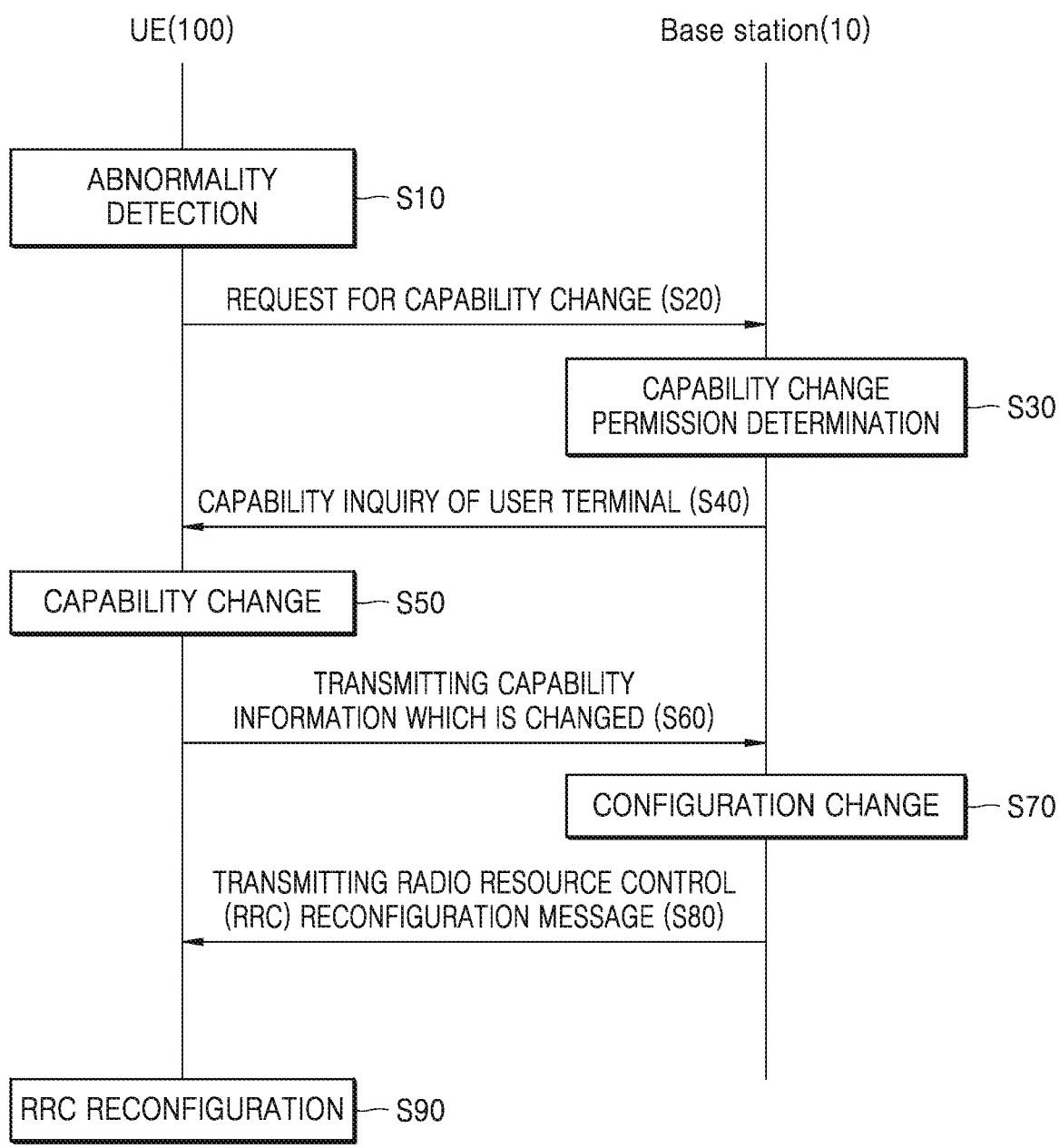
FIG. 2 illustrates a flowchart showing an operation of a wireless communication system according to an example embodiment of the inventive concepts.

FIG. 2 illustrates a flow diagram explaining an operation of a wireless communication system according to an example embodiment of the inventive concepts. FIG. 2 may be, for example, a flowchart of an operation of the wireless communication system 1 of FIG. 1.

Referring to FIG. 2, in operation S10, the user terminal 100 may detect an abnormality. In operation S20, the user terminal 100 may request a capability change permission of the base station 10 in response to the detection of the abnormality. For example, the user terminal 100 may include a plurality of functional blocks and may request the capability change permission based on the available resources identified with reference to the functional blocks. In addition, the user terminal 100 may provide a reason for the capability change to the base station 10 when the capability change permission is requested.

In operation S30, the base station 10 that receives the capability change permission request may determine whether the capability change of the user terminal 100 is permitted. In an example embodiment, the base station 10 may further receive a reason for a capability change from the user terminal 100 to determine whether the capability change of the user terminal 100 is permitted based on the received reason for the capability change.

In operation S40, the base station 10 may determine a capability change permission of the user terminal 100 to transmit a permission decision and a capability inquiry signal to the user terminal 100. In operation S50, the user terminal 100 may change the capability in response to the received capability change permission decision and capability inquiry signal thereof. As an example, the user terminal 100 may change an entry size of the capability items in a list format among the capability items associated with each of the available resources. As another example, the user terminal 100 may change whether a capability item, which is not in the list format, among the capability items associated with each of the available resources is supported or not.

In operation S60, the user terminal 100 may transmit the changed capability information to the base station 10. Accordingly, the user terminal 100 may provide the base station 10 with the available resource information and the capability items limited based on a current state of the user terminal 100. Next, in operation S70, the base station 10 may change configurations associated with communication with the user terminal 100 in response to the received capability information. For example, the base station 10 may change the previous configuration to a configuration that consumes relatively less resources of the user terminal 100. In operation S80, the base station 10 may transmit a radio resource connection (RRC) reconfiguration message to the user terminal 100 based on the changed configuration. In operation S90, the user terminal 100 may perform an RRC reconfiguration operation in response to the RRC reconfiguration message received from the base station 10.

Under the wireless communication system 1 according to the inventive concepts, a communication association configuration between the base station 10 and the user terminal 100 may be adaptively changed based on whether there are available resources and an abnormality of the user terminal 100. Accordingly, the user terminal 100 may prevent or reduce various undesirable effects caused by communication under an abnormality from resources which are limited in advance.

Specifically, conventional wireless communication systems perform wireless communications according to set configurations. This may be disadvantageous for wireless communication systems including low cost user terminals with limited resources. For example, as the limited resources of a user terminal become exhausted, the available functionality/capability of the user terminal to process particular communications with a base station becomes reduced. This reduced functionality/capability of the user terminal may reduce or prevent the user terminal from maintaining a stable communication link with the base station and may impair or prevent the functioning of application on the user terminal.

However, as discussed herein, example embodiments provide an improved wireless communication system 1 that monitors the limited resources of the user terminal 100 by detecting whether an abnormality has occurred. Upon detecting an abnormality, the user terminal 100 may change a capability of the user terminal 100, and thereby mitigate or prevent the reduction of functionality/capability of the user terminal 100. In so doing, the example embodiments improve over or overcome the deficiencies of the conventional wireless communication systems.

Figure 3:
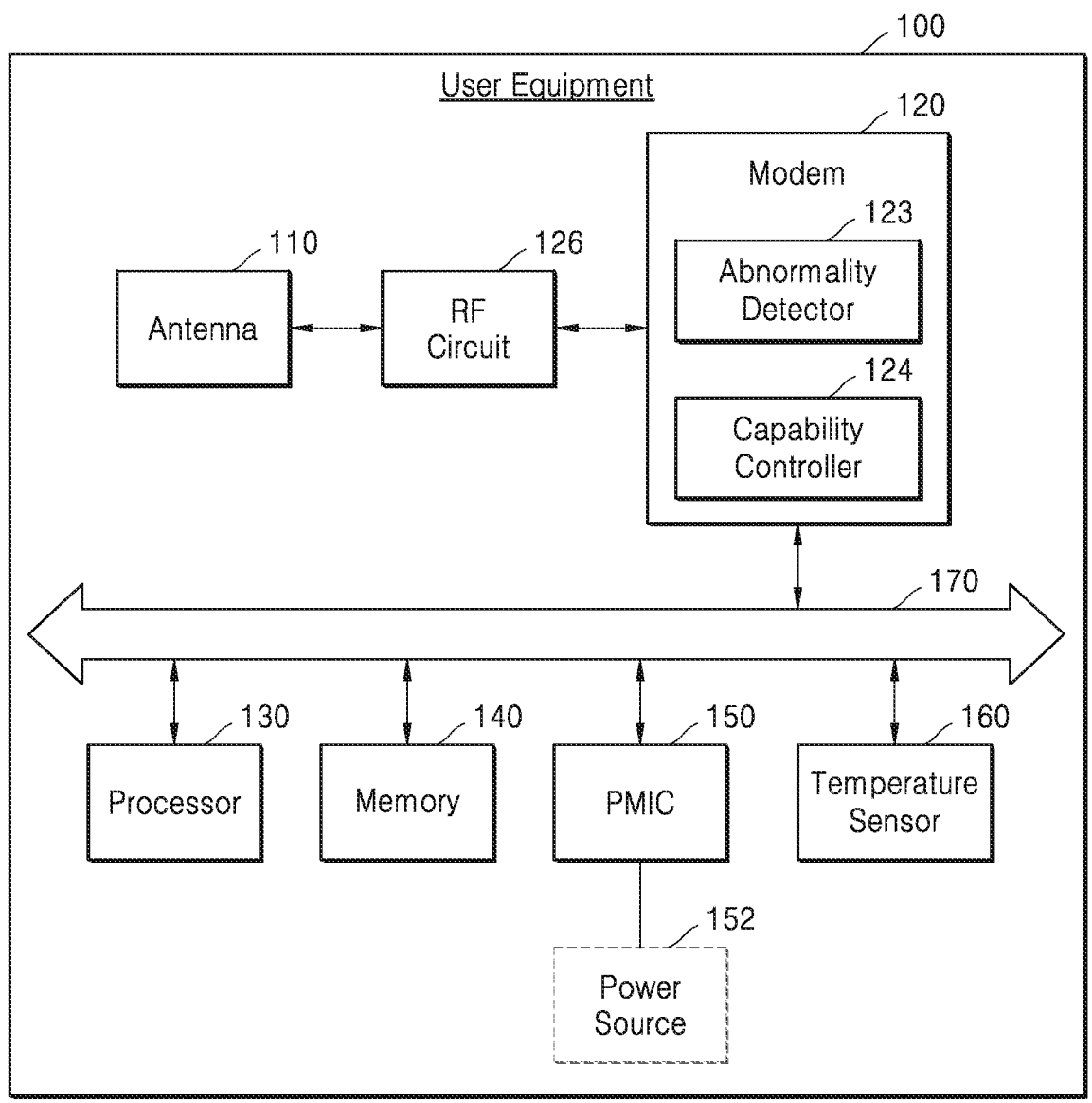
FIG. 3 is a block diagram illustrating a configuration of a user terminal according to an example embodiment of the inventive concepts.

FIG. 3 is a block diagram illustrating a configuration of a user terminal (also referred to herein as a "device") according to the inventive concepts. FIG. 3 may be, for example, a block diagram of the user terminal 100 of FIG. 1.

Referring to FIG. 3, the user terminal 100 may include an antenna 110, a modem 120, an RF circuit 126, at least one processor 130 (also referred to herein as the "processor"), a memory 140, a power management integrated circuit (PMIC) 150, a power supply source 152, a temperature sensor 160, and a system interconnection 170. Each of the components included in the user terminal 100 (e.g., the antenna 11, the modem 120, the RF circuit 126, the processor 130, the memory 140, the PMIC 150, the power supply source 152, the temperature sensor 160 and/or the system interconnection 170) may be a hardware block that includes analog circuits and/or digital circuits, and/or a software block that includes a plurality of computer-readable instructions executed by a processor (e.g., processor 130), and/or the like. According to some example embodiments, operations described herein as being performed by any or all of the modem 120, the abnormality detector 123, the capability controller 124, an event generator included in the modem 120 (discussed further below), the RF circuit 126, the processor 130, the memory 140, the PMIC 150 and/or the temperature sensor 160 may be performed by at least one processor (e.g., the processor 130) executing program code that includes instructions corresponding to the operations. The instructions may be stored in a memory of the user terminal 100 (e.g., the memory 140).

The RF circuit 126 may receive the radio signal transmitted by the base station 10 via the antenna 110. For example, the RF circuit 126 may move a radio signal in the frequency band of the high center frequency to the baseband to output the moved radio signal to the modem 120. In other words, the RF circuit 126 may demodulate the received radio signal to enable signal processing in the modem 120, the processor 130, and/or the memory 140. In addition, the RF circuit 126 may receive data from the modem 120 and may modulate the received data to transmit the modulated data to the base station 10 through the antenna 110.

The processor 130 may include an intelligent hardware device such as a central processing unit (CPU), a microcontroller, an application processor, and a graphics processing unit (GPU). In an example embodiment, the processor 130 may output information about available resources to the abnormality detector 123. As an example, the processor 130 may output an idle ratio to the abnormality detector 123 as information about the available resources of the processor 130. The idle ratio may mean a ratio of idle time to operating time of the processor 130. In another example, the processor 130 may output the quality of the programs used in the user terminal 100, the specified capability level of programs, a radio communication related capability specified by the modem 120, and/or the like to the abnormality detector 123 as information on the available resources of the processor 130.

In an example embodiment, the processor 130 may output an event signal to the abnormality detector 123 when the available resources have reached a certain value. The abnormality detector 123 may verify the available resources of the processor 130 and may detect whether there is an abnormal condition in response to the event signal output from the processor 130.

The memory 140 may include, for example, a volatile memory device such as dynamic random access memory (DRAM) or synchronous dynamic random access memory (SDRAM). In addition, the memory 140 may be, for example, electrically erasable programmable read-only memory (EEPROM), a flash memory, phase change random access memory (PRAM), resistance random access memory (RRAM), nano floating gate memory (NFGM), polymer random access memory (PoRAM), magnetic random access memory (MRAM), ferroelectric random access memory (FRAM), and/or the like.

The memory 140 may store software code that is computer readable and/or computer executable and includes a plurality of instructions. For example, the memory 140 may store a plurality of signal processing algorithms for signal processing of wireless communication.

In an example embodiment, the memory 140 may output information about available resources to the abnormality detector 123 (as discussed above, operations described as being performed by the memory 140 may be performed by at least one processor (e.g., the processor 130) executing program code that includes computer-readable instructions corresponding to the operations). In one example, the memory 140 may output the available memory size to the abnormality detector 123 as information about the available resources of the memory 140. Furthermore, in an example embodiment, the memory 140 may output an event signal to the abnormality detector 123 when the available resources have reached a certain value. The abnormality detector 123 may verify the available resources of the memory 140 and may detect whether there is an abnormality in response to the event signal output from the memory 140.

The PMIC 150 may be coupled to a power supply source 152 (e.g., a battery) and may control a level of power distributed to each component of the user terminal 100. For example, the PMIC 150 may control a level of voltage applied to each of the antenna 110, the modem 120, the RF circuit 126, the processor 130, the memory 140, and/or the temperature sensor 160, in response to a control signal received from a power management unit (PMU) (not illustrated).

In an example embodiment, the PMIC 150 may output information about available resources to the abnormality detector 123. For example, the PMIC 150 may output the remaining power amount of the power supply source 152 (the battery power amount remaining when the power supply source 152 is a battery) to the abnormality detector 123 as information on the available resources. In addition, in an example embodiment, the PMIC 150 may output an event signal to the abnormality detector 123 when the available resources reach a certain value. The abnormality detector may verify the available resources of the power supply source 152 and may detect whether there is an abnormality in response to the event signal output from the PMIC 150.

The temperature sensor 160 may sense the temperature of the user terminal 100 or the temperature of components included in the user terminal 100. In an example embodiment, the temperature sensor 160 is described as an independent component, but is not limited thereto. That is, the temperature sensor 160 may be included in one or more of the modem 120, the processor 130, the memory 140, and/or the PMIC 150.

In an example embodiment, the temperature sensor 160 may output information about available resources to the abnormality detector 123. As an example, the temperature sensor 160 may output information about the sensed temperature to the abnormality detector 123. In addition, in an example embodiment, the temperature sensor 160 may output an event signal to the abnormality detector 123 when the available resources have reached a certain value. The abnormality detector 123 may detect the available resources and may detect whether there is an abnormality in response to an event signal output from the temperature sensor 160.

The system interconnection 170 may be implemented as a bus to which a protocol having a standard bus standard is applied. For example, an advanced microcontroller bus architecture (AMBA) protocol of the advanced RISC machine (ARM) may be applied as a standard bus standard. The bus type of the AMBA protocol may include advanced high-performance bus (AHB), advanced peripheral bus (APB), advanced extensible interface (AXI), AXI4, AXI coherency extensions (ACE), and/or the like.

The abnormality detector 123 may identify the available resources from at least one of the processor 130, the memory 140, the PMIC 150, and/or the temperature sensor 160 to detect an abnormality based on the identified available resources. In an example embodiment, the modem 120 may further include an event generator (also referred to herein as an "event signal generator") for generating an event signal at a certain interval, and the abnormality detector 123 may perform a validation for available resources and an abnormality detection in response to the event signal. In an example embodiment, the abnormality detector 123 may perform the available resource identification and the abnormality detection in response to an event signal output from at least one of the processor 130, the memory 140, the PMIC 150, and/or the temperature sensor 160.

In an example embodiment, the abnormality detector 123 may determine whether an abnormality occurs by referring to an idle state ratio of the processor 130. The abnormality detector 123 may compare the idle state ratio of the processor 130 with a certain threshold value (or set and/or determined threshold value) and may determine that an abnormality occurs when the idle state ratio of the processor 130 is less than the certain threshold value. In addition, after determining that the abnormality has occurred, the abnormality detector 123 may determine that the abnormality has been released (e.g., resolved) when the idle state ratio of the processor 130 is determined to be greater than the certain threshold value.

In an example embodiment, the abnormality detector 123 may determine whether an abnormality occurs by referring to the available memory size of the memory 140. The abnormality detector 123 may compare an available memory size of the memory 140 with a certain threshold value and may determine that an abnormality occurs when the available memory size of the memory 140 is less than the certain threshold value. In addition, after determining that the abnormality has occurred, the abnormality detector 123 may determine that the abnormality has been released when the available memory size of the memory 140 is determined to be larger than the certain threshold value.

In an example embodiment, the abnormality detector 123 may determine whether an abnormality occurs by referring to the remaining power amount of the power supply source 152 from the PMIC 150. The abnormality detector 123 may compare the remaining power amount of the power supply source 152 with a certain threshold value and may determine that an abnormality occurs when the remaining power amount is less than a certain threshold value. In addition, after determining that the abnormality has occurred, the abnormality detector 123 may determine that the abnormality has been released (or canceled) when the remaining power amount of the power supply source 152 is determined to be greater than the certain threshold value.

In an example embodiment, the abnormality detector 123 may determine whether an abnormality occurs by referring to the temperature sensed by the temperature sensor 160. The abnormality detector 123 may compare the sensed temperature with a certain threshold value and may determine that an abnormality occurs when the sensed temperature is equal to or higher than the certain threshold value. In addition, after determining that the abnormality has occurred, the abnormality detector 123 may determine that the abnormality has been released when the sensed temperature is determined to be lower than the certain threshold value.

The capability controller 124 may control the capability of the user terminal 100 in response to the capability change permission decision of the base station 10 received via the antenna 110. In an example embodiment, the capability controller 124 may determine whether to change the capability items associated with the resource of each of the processor 130, the memory 140, the PMIC 150, and/or the temperature sensor 160 in response to the received capability change permission decision. For example, the memory 140 may store a table in which capability items related to each resource are defined, and the capability controller 124 may determine whether each capability item is changed by referring to the table.

In an example embodiment, the capability controller 124 may reduce a maximum (or upper limit) entry size of the corresponding capability item when a capability item to be changed is in a list format. In addition, the capability controller 124 may determine that the corresponding capability item is not supported when the capability item to be changed is not in a list format.

Figure 4:
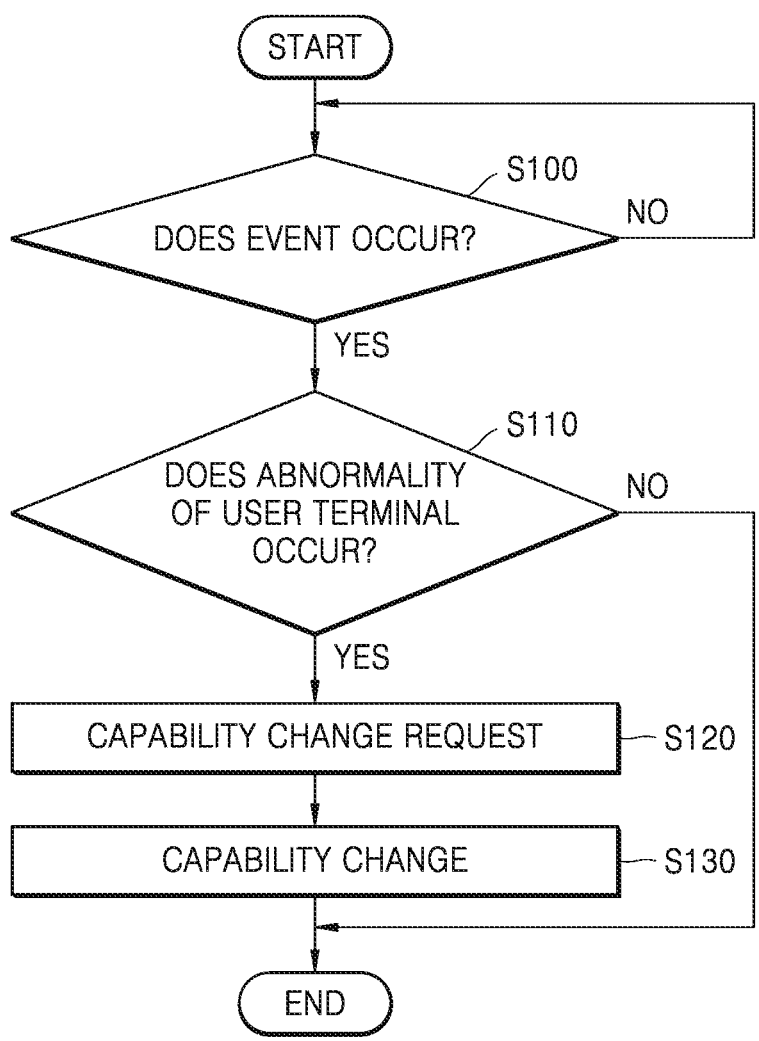
FIG. 4 illustrates a flowchart showing an operation of a user terminal for changing a capability in response to determining that an abnormality occurs according to an example embodiment of the inventive concepts.

FIG. 4 illustrates a flowchart showing an operation of a user terminal for changing a capability in response to determining that an abnormality occurs according to an example embodiment of the inventive concepts. FIG. 4 shows, for example, an operation of the user terminal 100 of FIG. 3.

Referring to FIG. 4, in operation S100, the user terminal 100 may determine whether an event signal is generated. For example, the event signal may be output from an event signal generator provided in the modem 120 based on a certain period. As another example, the event signal may be aperiodically output from at least one of the processor 130, the memory 140, the PMIC 150, and/or the temperature sensor 160 based on the available resources reaching a certain value. As another example, the event signal may be a configuration event signal transmitted from the base station 10.

In operation S110, the user terminal 100 may determine whether an abnormality of a user terminal occurs when an event signal is generated. For example, whether the terminal has generated an abnormality may be determined in the abnormality detector 123 in response to the event signal. The abnormality detector 123 may detect an abnormality by referring to the available resources of at least one of the processor 130, the memory 140, the PMIC 150, and/or the temperature sensor 160 (e.g., by referencing the reference table TB1 discussed in association with FIG. 6).

In operation S120, as it is determined that the abnormality occurs, the user terminal 100 may request the capability change from the base station 10. In addition, the user terminal 100 may provide a reason for the capability change to the base station 10. The reason for the capability change may be used as a reference of the capability change permission decision of the base station 10.

In operation S130, the user terminal 100 may change a capability of a terminal when the capability change is permitted from the base station 10 in response to a capability change request. For example, the capability controller 124 may change at least some of capability items associated with the resource of each of the processor 130, the memory 140, the PMIC 150, and/or the temperature sensor 160 in response to a capability change permission received from the base station 10.

Figure 5:
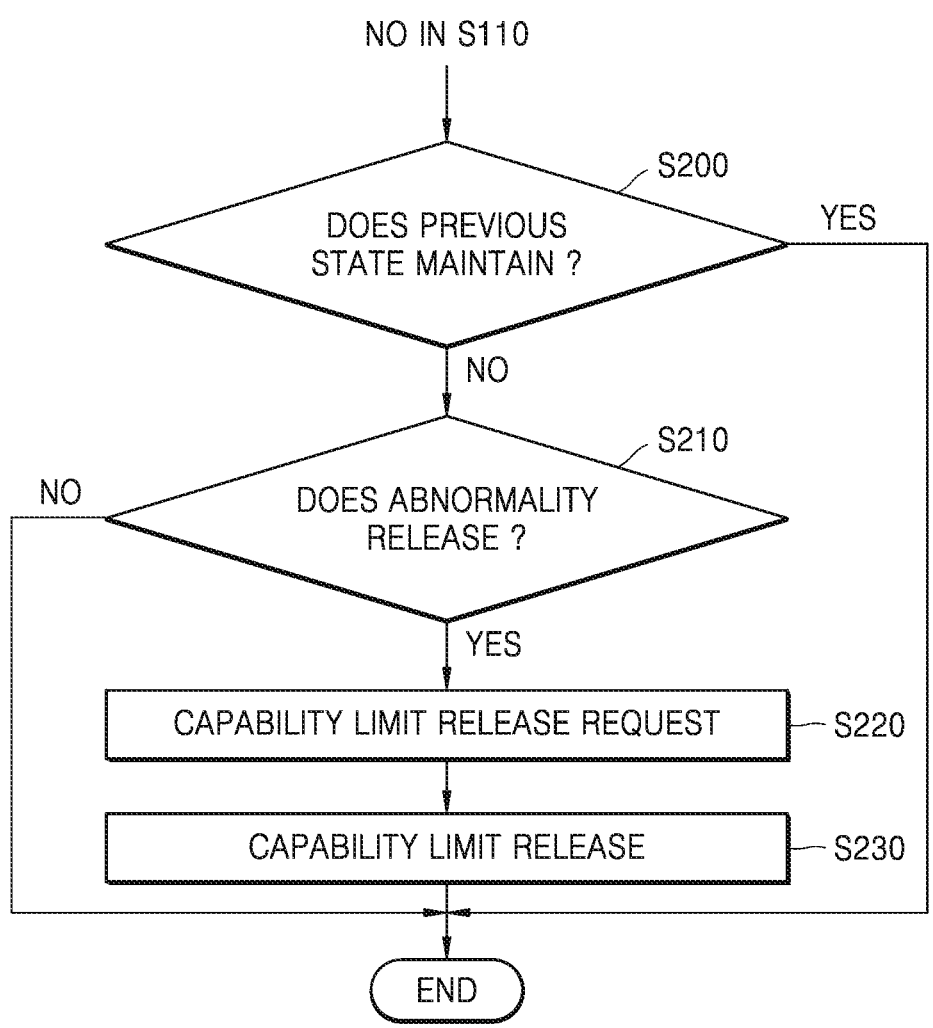
FIG. 5 illustrates a flowchart showing an operation of a user terminal for releasing a capability limit in response to determining that an abnormality is resolved according to an example embodiment of the inventive concepts.

FIG. 5 illustrates a flowchart showing an operation of a user terminal for releasing a capability limit in response to determining that an abnormality is resolved according to an example embodiment of the inventive concepts. FIG. 5 shows, for example, another example of operations after NO in operation S110 in FIG. 4.

Referring to FIG. 5, in operation S200, the user terminal 100, after determining in operation S110 that an abnormality has not occurred, may determine whether the previous state is maintained. For example, the user terminal 100 may have determined that a current terminal is in an abnormality or not in an abnormality in response to generation of a previous event signal when determining whether an abnormality occurs in response to a current event signal. That is, the user terminal 100 may determine whether a state determined based on the previous event signal is maintained when the user terminal 100 determines that an abnormality thereof does not occur in response to the current event signal.

For example, in operation S210, the user terminal 100 may determine whether an abnormality is released by determining that a condition of the previous terminal is an abnormality and the previous condition thereof is not maintained. For example, the abnormality detector 123 may determine whether the abnormality is released by referring to the available resources of at least one of the processor 130, the memory 140, the PMIC 150, and/or the temperature sensor 160.

In operation S220, the user terminal 100 may request the base station 10 to release the capability limit when it is determined that the abnormality is released. In addition, the user terminal 100 may provide a reason for the capability limit release to the base station 10. The reason for the capability limit release may be used as a reference of the capability limit release decision of the base station 10.

In operation S230, the user terminal 100 may release the capability limit of the user terminal when the capability limit release is allowed from the base station 10 in response to the capability limit release request. For example, the capability controller 124 may release a limit on at least some of capability items associated with the resource of each of the processor 130, the memory 140, the PMIC 150, and/or the temperature sensor 160 in response to a capability limit release permission received from the base station 10. By releasing the capability limit of the user terminal, the functionality/capability of the user terminal 100 increases as the availability of the limited resources of the user terminal 100 increase. In this way, the user terminal 100 is able to further mitigate or prevent the reduction of functionality/capability of the user terminal 100 when compared to the conventional wireless communication systems.

FIG. 6 illustrates an example of a reference table that is referenced in detecting an abnormality according to an example embodiment of the inventive concepts.

Referring to FIG. 6, an abnormality condition and an abnormality release condition corresponding to each resource may be defined in a reference table TB1. For example, the reference table TB1 may be stored in the memory 140.

The abnormality detector 123 may consider an available memory size as a resource corresponding to the memory 140. The abnormality detector 123 may determine whether there is an abnormality condition or an abnormality release condition by comparing (e.g., based on) the available memory size of the memory 140 with set threshold values.

In an example embodiment, the abnormality detector 123 may determine whether an abnormality condition is corresponded (e.g., satisfied) by comparing the available memory size of the memory 140 with a certain first threshold value. In this case, the set first threshold value may be a value obtained by subtracting a hysteresis error $Hys\_m$ from a memory threshold value $Mth$. The abnormality detector 123 may determine that the abnormality condition is corresponded when an available memory size is less than or equal to the set first threshold value.

In an example embodiment, the abnormality detector 123 may determine whether the abnormality release condition is corresponded by comparing the available memory size of the memory 140 with a certain second threshold value. In this case, the set second threshold value may be a value obtained by adding the hysteresis error $Hys\_m$ to the memory threshold value $Mth$. The abnormality detector 123 may determine that an abnormality release condition is corresponded when the available memory size is greater than the set second threshold value.

The abnormality detector 123 may consider a temperature sensed by the temperature sensor 160 as a reference resource for determining the abnormality. The abnormality detector 123 may determine whether there is an abnormality condition or an abnormality release condition by comparing a sensing temperature with set threshold values.

In an example embodiment, the abnormality detector 123 may determine whether the abnormality condition is corresponded by comparing the sensed current temperature with the certain first threshold value. In this case, the set first threshold value may be a value obtained by adding a hysteresis error $Hys\_t$ to a temperature threshold value $Tth$. The abnormality detector 123 may determine that the abnormality condition is corresponded when the sensed current temperature is equal to or greater than the set first threshold value.

In an example embodiment, the abnormality detector 123 may determine whether the abnormality release condition is satisfied by comparing the sensed current temperature with a set second threshold value. In this case, the set second threshold value may be a value obtained by subtracting the hysteresis error $Hys\_t$ from the temperature threshold value $Tth$. The abnormality detector 123 may determine that the abnormality release condition is satisfied when the sensed current temperature is less than the set second threshold value.

The abnormality detector 123 may consider the remaining power amount (the battery remaining amount when the power supply is a battery) as a resource corresponding to the power supply source 152. The abnormality detector 123 may determine whether there is an abnormality or an abnormality release condition by comparing the remaining power amount with set threshold values.

In an example embodiment, the abnormality detector 123 may determine whether the abnormality condition is corresponded by comparing the remaining power amount with a set first threshold value. In this case, a set first threshold value may be a value obtained by subtracting a hysteresis error $Hys\_p$ from a power threshold value $Bth$. The abnormality detector 123 may determine that the abnormality condition is satisfied when the remaining power is less than or equal to the set first threshold value.

In an example embodiment, the abnormality detector 123 may determine whether the abnormality release condition is met by comparing the remaining power amount with a set second threshold value. The set second threshold value may be a value obtained by adding the hysteresis error $Hys\_p$ to the power threshold value $Bth$. The abnormality detector 123 may determine that the abnormality release condition is satisfied when the remaining power amount is greater than the set second threshold value.

The abnormality detector 123 may consider the idle state ratio as a resource corresponding to the processor 130. The abnormality detector 123 may determine whether the abnormality condition is an abnormality condition or an abnormality release condition by comparing the idle state ratio of the processor 130 with the set threshold values.

In an example embodiment, the abnormality detector 123 may determine whether the abnormality condition is corresponded by comparing the idle state ratio with a set first threshold value. In this case, the set first threshold value may be a value obtained by subtracting the hysteresis error $Hys\_c$ from an idle state threshold value $Ith$. The abnormality detector 123 may determine that the abnormality condition is satisfied when the idle state ratio is equal to or less than the set first threshold value.

In an example embodiment, the abnormality detector 123 may determine whether the abnormality release condition is met by comparing the idle state ratio with a set second threshold value. In this case, the set second threshold value may be a value obtained by adding the hysteresis error $Hys\_c$ at the idle state threshold value $Ith$. The abnormality detector 123 may determine that the abnormality release condition is satisfied when the idle state ratio is greater than the set second threshold value.

Figure 7:
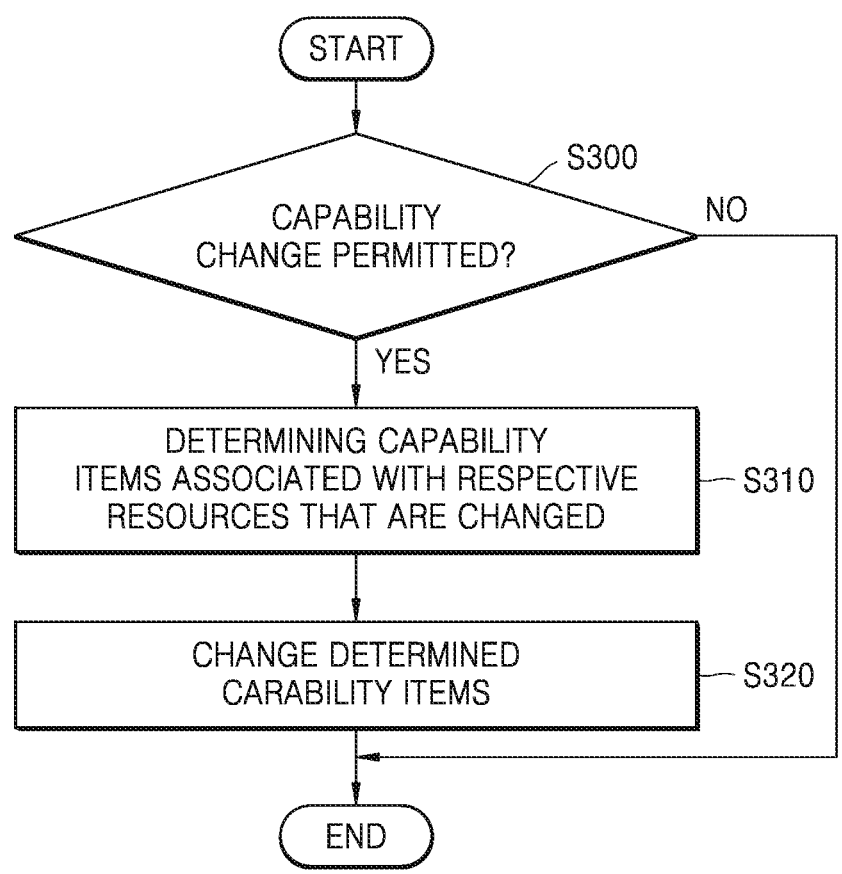
FIG. 7 illustrates a flowchart showing an operation of a user terminal for changing a capability item according to an example embodiment of the inventive concepts.

FIG. 7 illustrates a flowchart showing an operation of a user terminal for changing a capability item according to an example embodiment of the inventive concepts. FIG. 7 may illustrate, for example, an operation of the user terminal 100 of FIG. 3.

Referring to FIG. 7, in operation S300, the user terminal 100 may determine whether a capability change is permitted from the base station 10. For example, the user terminal 100 may determine whether a capability change is permitted by receiving a capability change permission decision (e.g., indication) and a capability inquiry signal from the base station 10.

In operation S310, as the capability change is permitted from the base station 10, the user terminal 100 may determine whether the capability items associated with each resource thereof is changed. The resource may be at least one of, for example, the size of available memory, the temperature sensed by the temperature sensor 160, the remaining power amount of the power supply source 152, and the idle state ratio of the processor 130. In operation S320, the user terminal may change the capability items determined in operation S310 to have changed. For example, the capability controller 124 may determine whether each of a plurality of capability items associated with each of the resources is changed and may make changes to the determined capability items.

Figures 8A, 8B:
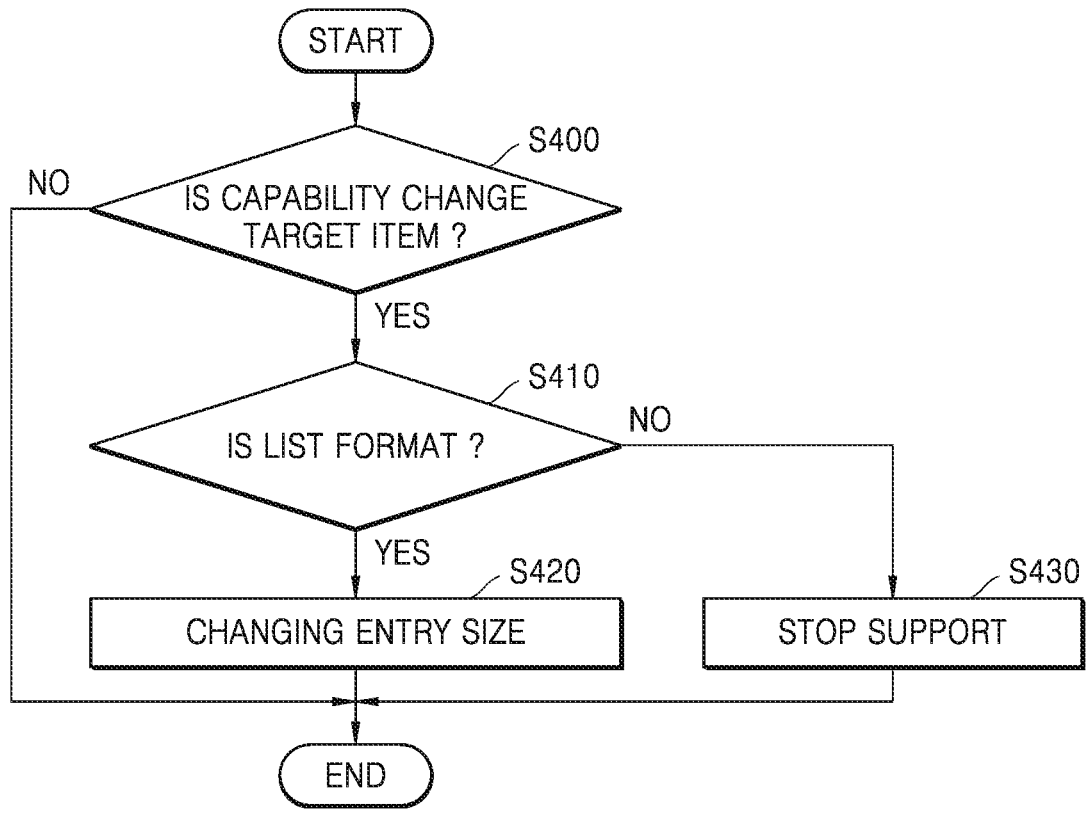
FIGS. 8A and 8B are diagrams for explaining a change in a capability item according to an example embodiment of the inventive concepts.

FIGS. 8A and 8B are diagrams for explaining a change of a capability item according to an example embodiment of the inventive concepts. Specifically, FIG. 8A illustrates a flowchart showing a change in a capability item, and FIG. 8B illustrates a table in which capability items associated with a resource are defined.

Referring to FIGS. 8A and 8B, in operation S400, the user terminal 100 may determine whether there is a capability change target item for each of a plurality of capability items associated with each resource thereof. As an example, a table TB2 may be stored in the memory 140 including a plurality of capability items i_1 to i_4 associated with an available memory size. The table TB2 also includes an indication associated with each of the capability items i_1 to i_4 indicating whether the associated capability item is changed along with the change related contents. The capability controller 124 may refer to the table TB2 when changing a capability item. In an example embodiment, the table TB2 is described as having defined capability items associated with the available memory size, but this is only an example for convenience of explanation, and other tables in which capability items related to idle state ratio, remaining power, and/or temperature are defined may be stored in the memory 140. In addition, the table TB2 may include four capability items i_1 to i_4, but this is only for convenience of explanation, and the number of capability items may be less or greater than the four capability items i_1 to i_4.

In an example embodiment, the capability controller 124 may sequentially calculate the available resource amount for each of the capability items associated with the available resources and may determine whether each capability item is sequentially changed based on the calculated available resource amount. For example, for the capability items related to the available memory size, the amount of available resources of the capability item k may be calculated by the following [Equation 1] when the number of each capability item is defined as i, the amount of current available resources is defined as A0, and the amount of resources used by the i-th capability item is defined as Ri.

$$Ak = A0 - \Sigma Ri (i=0 \sim k-1)$$ [Equation 1]

The capability items may be in a list format or not in the list format. For example, in the case of the list format, the size of the entry may be considered. In the case of not the list format, only whether the corresponding capability item is supported may be considered. The number n of entries used for the corresponding capability item may be calculated by the following [Equation 2] when the capability item is in a list format.

[Equation 2]

$$n = \min\left(\frac{Ak}{E}, \text{Max Entry Size}\right)$$ [Equation 2]

In Equation 2, Entry Size may denote the amount of resources used by an entry in each list. Thus, the used resource amount Rk of the capability item k of the list format may be calculated by the following [Equation 3].

$$Rk = n*E$$ [Equation 3]

Next, in operation S410, the user terminal 100 may determine whether each capability item is in a list format. In the table TB2, the first capability item i_1 and the third capability item i_3 may be in the list format, and the second capability item i_2 and the fourth capability item i_4 may not be in the list format. In other words, the amount of available resources of each of the first and third capability items i_1 and i_3 may be calculated through Equations 1 to 3, and the amount of available resources of each of the second and fourth capability items i_2 and i_4 may be calculated through Equation 1.

For example, the first and second capability items i_1 and i_2 may be excluded from a capability change target as the first and second capability items i_1 and i_2 are determined to be acceptable when an amount of each available resource (e.g., available memory size) considers an available memory size of a current memory. In addition, the third and fourth capability items i_3 and i_4 may be the capability change target as the third and fourth capability items i_3 and i_4 are determined to be unacceptable when the amount of each available resource (e.g., available memory size) considers an available memory size of the memory 140.

In operation S420, the user terminal 100 may change an entry size of the corresponding capability item when the capability item is in a list format. Specifically, the capability controller 124 may reduce an entry size of the third capability item i_3, which is a capability item in the list format. For example, the capability controller 124 may reduce the maximum (or upper limit) entry size of the third capability item i_3.

In operation S430, the user terminal 100 may change whether the capability item is supported when the capability item is not in the list format. Specifically, the capability controller 124 may change not to (e.g., end, stop and/or discontinue) support the fourth capability item i_4, which is a capability item in the non-list format. Thus, the user terminal 100 may adaptively change the capability considering the limited resources (that is, the limited memory size). The user terminal 100 may reduce the resources used for processing particular types of communications, and thereby reduce or prevent signal processing errors that may otherwise result from insufficient resources at the user terminal 100. Also, the user terminal 100 may reduce or prevent the processing of particular types of communications, and thereby conserve resources at the user terminal 100 for use in processing other types of communications that may otherwise result in signal processing errors due to insufficient resources. In this way, the user terminal 100 is able to further mitigate or prevent the reduction of functionality/capability of the user terminal 100 when compared to the conventional wireless communication systems.

FIGS. 9A and 9B are diagrams illustrating each example of a capability item according to an example embodiment of the inventive concepts. For example, FIG. 9A shows capability items in a list format, and FIG. 9B shows capability items in a non-list format, respectively.

Referring to FIG. 9A, a resource list of a channel state information reference signal (CSIRS) may be provided as a capability item having a list format. The resource list of the CSIRS may provide information on an entry size 210, and the entry size 210 may be specified in a range from 1 to a maximum (or upper limit) value.

For example, the user terminal 100 may change the maximum (or upper limit) value of the entry size 210 by determining the resource list of the CSIRS as a capability change target item. Specifically, as the capability controller 124 determines that the abnormality detector 123 is in the abnormality, the capability controller 124 may transmit a capability change request to the base station 10, and the capability controller 124 may reduce the maximum (or upper limit) value of the entry size 210 in response to the capability change request.

Referring to FIG. 9B, a channel CSI-RS-CFRA-ForHO (e.g., channel state information-reference signal-contention free random access-for handover) for channel information level measurement may be provided as a capability item in a non-list format. A supportability 220 indicating whether a channel is supported may be designated in association with a channel for channel information level measurement.

For example, the user terminal 100 may change the supportability 220 of the corresponding item by determining the channel for channel information level measurement as a capability change target item. Specifically, as the capability controller 124 determines that the abnormality detector 123 is in the abnormality, the capability controller 124 may transmit a capability change request to the base station 10, and the capability controller 124 may change the supportability 220 of the channel for channel information level measurement from 'support' to 'not support' in response to the capability change request.

FIG. 10 illustrates a table in which capability items associated with a resource are defined according to an example embodiment of the inventive concepts. For example, FIG. 10 may illustrate a table TB3 explaining a change of each capability item when the abnormality release condition is satisfied.

Referring to FIG. 10, in a limited state of the capability items according to the abnormality, the limit of the limited capability items may be released as the abnormality detector 123 determines the release of the abnormality. For example, the table TB3 may limit the third and fourth capability items i_3 and i_4 according to the previous abnormality, and the first and second capability items i_1 and i_2 may represent unlimited situations.

For example, the abnormality detector 123 may transmit a request for releasing a capability limit to the base station 10 as the release of the abnormality is determined, and the capability controller 124 may release the restriction of the third and fourth capability items i_3 and i_4 in response to the capability limit release permission responding thereto. As a result, the capability controller 124 may increase the maximum (or upper limit) value of the entry size of the third capability item i_3. In addition, the capability controller 124 may change the supportability of the fourth capability item i_4 from 'not supported' to 'supported'.

Figure 11:
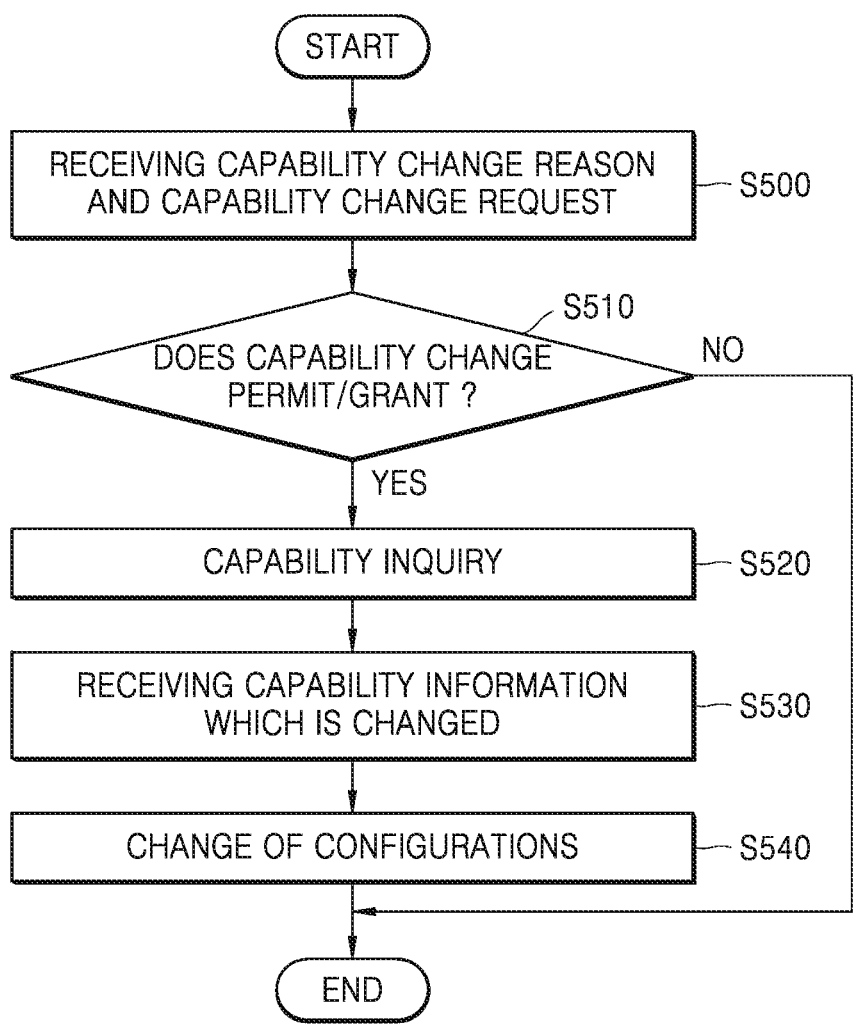
FIG. 11 illustrates a flowchart showing an operation of a base station according to an example embodiment of the inventive concepts.

FIG. 11 illustrates a flowchart showing an operation of a base station according to an example embodiment of the inventive concepts. FIG. 11 may illustrate, for example, an operation of the base station 10 of FIG. 1.

Referring to FIG. 11, in operation S500, the base station 10 may receive a capability change reason and a capability change request from the user terminal 100. In operation S510, the base station 10 may determine whether the capability change of the user terminal 100 is permitted based on the received capability change reason. Specifically, the base station 10 may determine whether the capability change is permitted based on the capability change reason transmitted from the user terminal 100 and the communication resources with other terminals.

In operation S520, the base station 10 may transmit a permission decision and a capability inquiry signal of a terminal to the user terminal 100 when the capability change permission of the user terminal 100 is determined. Accordingly, the user terminal 100 may change the capability in response to the permission decision and may transmit the capability information of a terminal (e.g., UE) to the base station 10 in response to the capability inquiry signal.

In operation S530, the base station 10 may receive the changed capability information from the user terminal 100. Thus, the base station 10 may be provided with the available resource information and the limited capability items of the user terminal 100. Next, in operation S540, the base station 10 may change the setting associated with the communication with the user terminal 100 in response to the capability information received from the user terminal 100. The base station 10 may transmit an RRC reconfiguration message to the user terminal 100 based on the changed setting.

Figure 12:
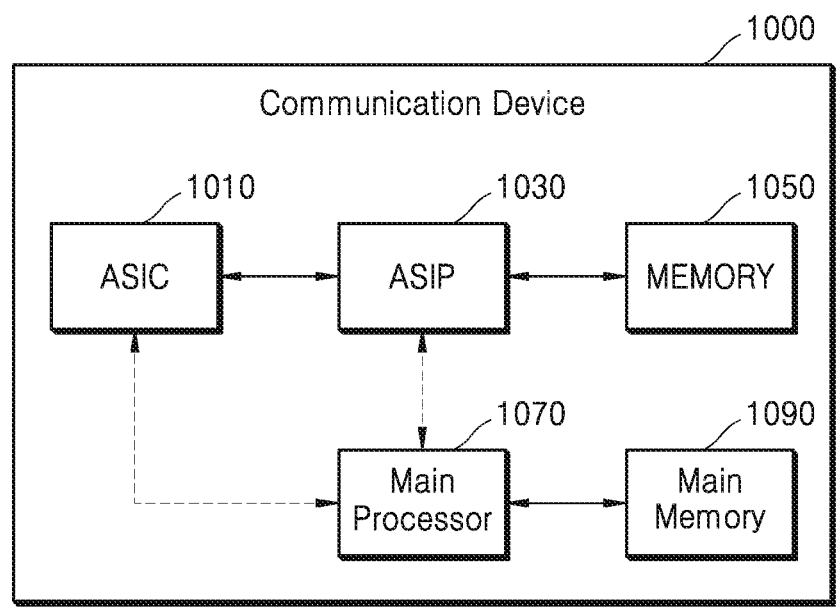
FIG. 12 shows a block diagram of a wireless communication device according to an example embodiment of the inventive concepts.

FIG. 12 shows a block diagram of a wireless communication device 1000 according to an example embodiment of the inventive concepts. As illustrated in FIG. 12, a wireless communication device 1000 may include an application specific integrated circuit (ASIC) 1010, an application specific instruction set processor (ASIP) 1030, a memory 1050, at least one main processor 1070 (also referred to as the "main processor"), and a main memory 1090. Two or more of the ASIC 1010, the ASIP 1030, and the main processor 1070 may communicate with each other. In addition, at least two of the ASIC 1010, the ASIP 1030, the memory 1050, the main processor 1070, and the main memory 1090 may be embedded in one chip.

The ASIP 1030 may be an integrated circuit customized for a particular application, may support a dedicated instruction set for a particular application, and may execute instructions in the instruction set. The memory 1050 may communicate with ASIP 1030 and may store a plurality of instructions executed by the ASIP 1030 in non-volatile storage. For example, the memory 1050 may include any type of memory accessible by the ASIP 1030 such as random access memory (RAM), read only memory (ROM), tape, a magnetic disk, an optical disk, a volatile memory, a non-volatile memory, and combinations thereof as a non-limiting example.

The main processor 1070 may control the wireless communication device 1000 by executing a plurality of instructions. For example, the main processor 1070 may control the ASIC 1010 and the ASIP 1030, may process data received through multiple input multiple output (MIMO) channels, and/or may process a user input to the wireless communication device 1000. The main memory 1090 as a non-volatile storage may communicate with the main processor 1070 and may store a plurality of instructions executed by the main processor 1070.

The components of the aforementioned user terminal (e.g., 100 of FIG. 3) and the method of operation thereof may be implemented as at least one of the components included in the wireless communication device 1000. For example, at least one of the abnormality detector 123 and the capability controller 124 of FIG. 3 may be implemented as a plurality of instructions stored in the memory 1050.

The various operations of methods described above may be performed by any suitable device capable of performing the operations, such as various hardware and/or software implemented in some form of hardware (e.g., processor, ASIC, etc.).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or operations of a method or algorithm and functions described in connection with some example embodiments may be embodied directly in hardware, in a software module executed by at least one processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

As described above, example embodiments have been disclosed in the drawings and specification. While some example embodiments of the inventive concepts have been described herein with reference to specific examples thereof, it should be understood that they have been presented only to illustrate the technical idea of the inventive concepts and not to limit the scope of the inventive concepts. Therefore, those skilled in the art will appreciate that various modifications and equivalent example embodiments are possible without departing from the scope of the inventive concepts. Accordingly, the true scope of protection of the inventive concepts should be determined by the technical idea of the appended claims.

While the inventive concepts has been particularly shown and described with reference to examples thereof, it will be understood that various changes in form and details may be made therein without departing from the spirit and scope of the following claims.

What is claimed is:

1. A method performed by a device configured to perform communication with a base station, the method comprising:
   detecting whether an abnormality of the device occurs in response to an event signal;
   sending a request to the base station for permission to change a capability of the device based on the detecting that the abnormality occurs;
   changing the capability of the device based on a permission indication received from the base station in response to the sending the request;
   sending changed capability information to the base station based on the changing; and
   performing a radio resource connection (RRC) reconfiguration operation based on an RRC reconfiguration message received from the base station in response to the sending the changed capability information.

2. The method of claim 1, wherein
   the device comprises a memory configured to store data generated by performing the communication with the base station, and
   the detecting whether the abnormality of the device occurs is based on an available memory size of the memory and a first threshold value.

3. The method of claim 2, wherein
   the first threshold value is a value obtained by subtracting a memory hysteresis error from a set memory threshold value, and
   the detecting whether the abnormality occurs includes determining that a first abnormality condition is satisfied when the available memory size is less than or equal to the first threshold value.

4. The method of claim 3, wherein the changing the capability changes at least one capability item among a plurality of capability items associated with the available memory size.

5. The method of claim 4, wherein
   a first capability item among the plurality of capability items has a list format, and
   the changing the capability item includes reducing an entry size of the first capability item.

6. The method of claim 5, wherein
   a second capability item among the plurality of capability items has a non-list format, and
   the changing the capability item includes changing whether to support the second capability item.

7. The method of claim 2, further comprising:
   determining that a first abnormality release condition is satisfied when the available memory size is larger than a second threshold value, the second threshold value being a sum of a memory hysteresis error and a set memory threshold value.

8. The method of claim 1, wherein
   the device comprises a temperature sensor configured to sense a temperature of the device, and
   the detecting whether the abnormality occurs is based on the temperature sensed by the temperature sensor and a third threshold value.

9. The method of claim 8, wherein
   the third threshold value is a sum of a temperature hysteresis error and a set temperature threshold value, and
   the detecting whether the abnormality occurs includes determining that a second abnormality condition is satisfied when the temperature is equal to or higher than the third threshold value.

10. The method of claim 8, further comprising:
    determining that a second abnormality release condition is satisfied when the temperature is less than a fourth threshold value, the fourth threshold value being obtained by subtracting a temperature hysteresis error from a set temperature threshold value.

11. The method of claim 1, wherein
    the device comprises
    a power supply source, and
    a power management integrated circuit (PMIC) configured to control a power supply from the power supply source to the device, and
    the detecting whether the abnormality occurs is based on a remaining power amount of the power supply and a fifth threshold value, the remaining power amount being determined using the PMIC.

12. The method of claim 11, wherein
the fifth threshold value is obtained by subtracting a power hysteresis error from a set power threshold value, and
the detecting whether the abnormality occurs includes determining that a third abnormality condition is satisfied when the remaining power amount is less than or equal to the fifth threshold value.

13. The method of claim 11, further comprising:
determining that a third abnormality release condition is satisfied when the remaining power amount is greater than a sixth threshold value, the sixth threshold value being a sum of a power hysteresis error and a set power threshold value.

14. The method of claim 1, wherein
the device comprises a processor, and
the detecting whether the abnormality occurs is based on an idle ratio of the processor and a seventh threshold value.

15. The method of claim 14, wherein
the seventh threshold value is obtained by subtracting an idle state hysteresis error from a set idle state ratio threshold value, and
the detecting whether the abnormality occurs includes determining whether a fourth abnormality condition is satisfied when the idle ratio is less than the seventh threshold value.

16. The method of claim 14, further comprising:
determining that a fourth abnormality release condition is satisfied when the idle ratio is larger than an eighth threshold value, the eighth threshold value being a sum of an idle state hysteresis error and a set idle state ratio threshold.

17. The method of claim 1, wherein the request of the device includes a reason for changing the capability of the device.

18. A device configured to perform wireless communication with a base station, the device comprising:
a memory storing computer-readable instructions; and
at least one processor configured to execute the computer-readable instructions to
determine available resources of each of a plurality of functional blocks, each of the plurality of functional blocks being configured to perform signal processing associated with the wireless communication,
determine whether each functional block among the plurality of functional blocks is in an abnormality state based on the available resources, and
change a capability item associated with the available resources of each of the plurality of functional blocks in response to receiving a capability change permission indication from the base station based on the determination that a functional block among the plurality of functional blocks is in the abnormality state.

19. The device of claim 18, wherein
the memory stores data for the wireless communication as a functional block among the plurality of functional blocks, and
the at least one processor is configured to execute the computer-readable instructions to determine whether the memory is in an abnormal state based on an available memory size of the memory and a threshold value.

20. A method performed by a base station configured to perform wireless communication with a terminal, the method comprising:
determining whether to permit a capability change of the terminal based on a capability change permission request and a reason for the capability change permission request;
sending a capability change permission indication and a capability inquiry signal to the terminal in response to the determining to permit the capability change;
receiving, from the terminal, changed capability information in response to the sending the capability inquiry signal;
changing a configuration of the wireless communication based on the changed capability information; and
sending a radio resource connection (RRC) reconfiguration message to the terminal based on the changing the configuration.

* * * * *